(12) United States Patent
Kassman et al.

(10) Patent No.: US 6,565,113 B2
(45) Date of Patent: May 20, 2003

(54) AIR BAG MODULE

(75) Inventors: Mark E. Kassman, Miamisburg, OH (US); Mark Thomas Winters, Troy, OH (US); Ann L. Kneisly, Dayton, OH (US); Patrick W. Schatz, Lebanon, OH (US); Ryan Todd Pinsenschaum, Vandalia, OH (US)

(73) Assignee: Delphi Technologies, Inc., Troy, MI (US)

( * ) Notice: Subject to any disclaimer, the term of this patent is extended or adjusted under 35 U.S.C. 154(b) by 39 days.

(21) Appl. No.: 09/780,577

(22) Filed: Feb. 9, 2001

(65) Prior Publication Data

US 2002/0109337 A1 Aug. 15, 2002

(51) Int. Cl.$^7$ .............................................. B60R 21/16
(52) U.S. Cl. ................ 280/728.2; 280/728.3; 280/731
(58) Field of Search .................... 280/731, 728.2, 280/728.3, 728.1

(56) References Cited

U.S. PATENT DOCUMENTS

| | | | |
|---|---|---|---|
| 5,562,301 A | 10/1996 | Lutz | 280/728.2 |
| 5,564,730 A * | 10/1996 | Chizenko et al. | 280/728.1 |
| 5,577,768 A * | 11/1996 | Taguchi et al. | 280/735 |
| 5,647,610 A * | 7/1997 | Nagata | 280/731 |
| 5,678,850 A | 10/1997 | Ricks et al. | 280/728.2 |
| 5,738,370 A * | 4/1998 | Hosoi et al. | 280/731 |
| 5,803,494 A | 9/1998 | Headley | 280/741 |
| 5,845,928 A * | 12/1998 | Nelsen et al. | 280/728.2 |
| 6,029,992 A * | 2/2000 | Vendely et al. | 280/728.2 |
| 6,109,646 A * | 8/2000 | Nagata et al. | 280/731 |
| 6,241,283 B1 * | 6/2001 | Zarazua | 280/743.2 |
| 6,336,659 B1 * | 1/2002 | Corrion | 280/736 |

* cited by examiner

Primary Examiner—Paul N. Dickson
Assistant Examiner—Laura B. Rosenberg
(74) Attorney, Agent, or Firm—Kathryn A. Marra

(57) ABSTRACT

An air bag module having an inflator with an inflator flange, a plurality of mounting studs depending outwardly from the inflator flange. An air bag cushion is positioned about the inflator flange. The air bag cushion allows a portion of the inflator to be inserted into the air bag cushion and the plurality of mounting studs passing through openings in the air bag cushion. An air bag cover having a plurality of retaining members is secured to the inflator flange, the retaining members sandwich a portion of the air bag cushion in between the inflator flange and the retaining members. A base plate having a plurality of securement members is secured to the cover portion and the plurality of mounting studs.

25 Claims, 6 Drawing Sheets

AIR BAG MODULE

TECHNICAL FIELD

The present invention relates to an air bag module and in particular an air bag module assembly.

BACKGROUND

Most motor vehicles are provided with an air bag module that is mounted to the vehicle in order to deploy in a manner so as to protect the vehicle occupant. For example, a driver's side air bag module includes a generally toroidal inflator positioned partially within a bag opening of an air bag for discharging inflator gas to inflate the air bag upon sensing certain predetermined vehicle conditions.

The undeployed air bag is folded atop the inflator and a module cover overlies the air bag, inflator and other module components. The cover commonly has tear lines or weakened portions that allow the cover to open during air bag inflation.

Typically, the inflator includes a main body portion which discharges gas and the inflator has an outwardly extending inflator mounting flange. The module also includes an air bag retainer. The air bag retainer is located within the bag opening of the air bag and including a central gas opening for receiving the inflator therethrough.

It is also typical to connect the air bag retainer to the air bag by a first fastening mechanism, to connect the air bag retainer to the base plate by a second fastening mechanism, and to connect the inflator to the base plate by a third fastening mechanism. The air bag retainer, air bag, inflator, and cover are each connected to the base plate to form the air bag module. Typically, the first, second, and third fastening mechanisms are each composed of one or more parts.

In addition, the module typically includes a plurality of axially elongated mounting members or female fasteners mounted to the base plate to connect the module to a hub portion of a steering wheel. In some applicaitons the module perimeter is wider than a perimeter of the steering column of a steering wheel assembly, the mounting members on the base plate are located outboard of the perimeter of the steering column such that access holes can be provided in the hub portion directly beneath the mounting members for rear release of the mounting members for disconnection of the module from the steering wheel.

In addition, and in some applications the multiplicity of fastening mechanisms required to retain the module components to each other along with the mounting members required to mount the module to the steering wheel greatly increases assembly time.

SUMMARY OF THE INVENTION

The present invention preferably provides a module having mounting members which both retain the components of the air bag module and which also mount the module to the vehicle. Advantageously, the present invention simplifies the module by reducing the number of fastening components in the module, thus reducing mass, cost and assembly steps.

In accordance with an exemplary embodiment of the present invention, the air bag cushion retaining ring is completely removed from the air bag module design. The air bag cushion is secured to the inflator flange by being sandwiched in between a retaining member and the inflator flange. In addition, mounting studs pass through apertures in the air bag cushion. The assembly is held together by a plurality of fastening members which are secured to the plurality of mounting studs causing a base plate and the inflator flange to provide surfaces for securing the air bag cover retaining members and the air bag cushion.

In an exemplary embodiment, the module preferably enables easy snap-fitted attachment of the module to the vehicle using the same mechanism that retains the components.

The above-described and other features and advantages of the present invention will be appreciated and understood by those skilled in the art from the following detailed description, drawings, and appended claims.

BRIEF DESCRIPTION OF THE DRAWINGS

The present invention will now be described, by way of example, with reference to the accompanying drawings in which.

DESCRIPTION OF THE PREFERRED EMBODIMENT

Figure 1:
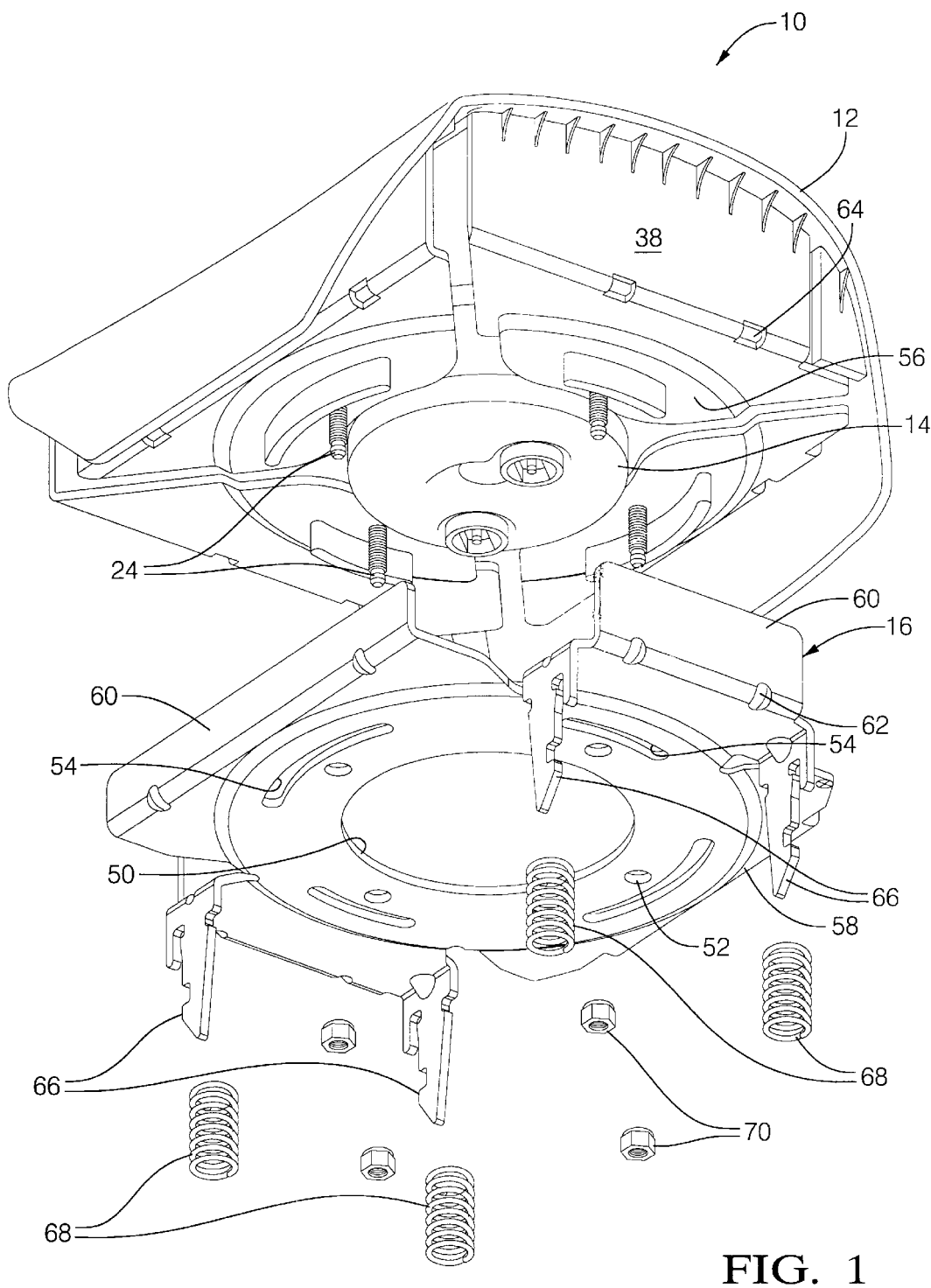
FIG. 1 is an exploded perspective view of an air bag module constructed in accordance with the present invention.

Referring now to FIGS. 1–8, an air bag module assembly 10 constructed in accordance with an exemplary embodiment of the present invention is illustrated. Air bag module assembly 10 includes a cover portion 12 an inflator 14 and a base plate 16. Cover portion 12 is constructed out a molded polymer or vinyl material. Cover portion 12 has an exterior surface that has aesthetic qualities and is capable of matching the interior of a vehicle (not shown). In addition, cover portion 12 has predetermined tear seams positioned to allow portions of cover portion 12 to displace while an air bag of air bag module 10 deploys.

Inflator 14 has an inflator flange 18 disposed about the periphery of a central inflation chamber 20 of inflator 14. Central inflation chamber 20 of inflator 14 houses the materials necessary to generate a resultant gas which is passed through a plurality of apertures 22 in central inflation chamber 20. Such materials may include but are not limited to the following: pyrotechnic materials and stored gases which are heated in response to the ignition of the pyrotechnic materials through the firing of a squib. The firing of the squib is initiated by a signal received from a sensor appropriately positioned in the vehicle. The sensor provides a signal when an adverse vehicle condition, such as a massive deceleration and or crash, has occurred. For example, the sensor may be an accelereometer.

Inflator 14 may be such an inflator as shown and described in commonly owned and assigned United States Provisional Application Serial No. 60/248,997, filed Nov. 15, 2000, the contents of which are incorporated herein by reference thereto. Of course, inflator 14 may be any type of air bag inflator (driver's side or otherwise) which provides a means for inflating and deploying an air bag. For example, U.S. Pat. Nos. 5,803,494 and 5,806,883, the contents of which are incorporated herein by reference thereto.

A plurality of mounting studs 24 are secured to inflator flange 18. During assembly and referring now to FIG. 5, an inflatable air bag cushion 26 is secured to inflator 14. Inflatable air bag cushion 26 has an inflation opening 28 which allows a portion of inflator 14 to be received within an inner cavity 30 of inflatable air bag cushion 26. Positioned along the periphery of opening 28 are a plurality of securement openings 32 which are sufficiently large enough to allow mounting studs 24 of inflator 14 to pass therethrough. Thus, inflator 14 is positioned to inflate inflatable air bag 26.

It is also noted that inflator flange 18 has an end periphery 34 which is manufactured to have a surface sufficiently stiff and blunt to provide a surface for retaining a portion of the air bag cushion as well as other functional aspects of inflator 14. For example, and as an example of one configuration, end periphery 34 may be configured to have a rolled surface. Accordingly, the surface of end periphery 34 will protect the integrity of inflatable air bag cushion 26.

Figure 6:
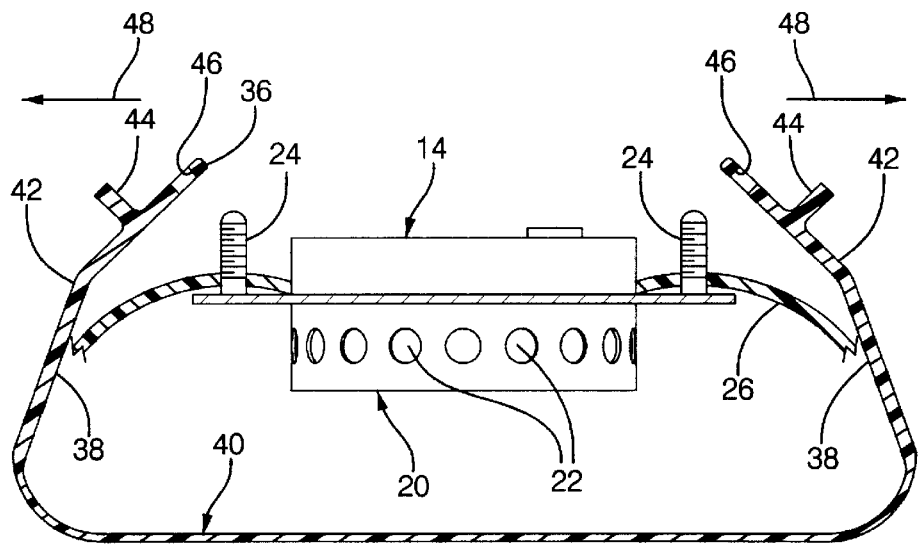
Figure 7:
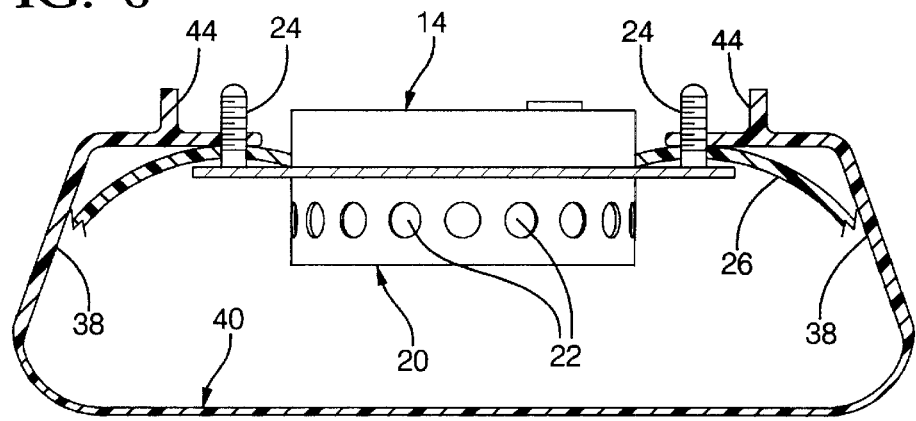

Once inflatable air bag cushion 26 has been positioned onto inflator 14 and referring now to FIGS. 6 and 7, the attachment of cover portion 12 is now illustrated. Cover portion 12 is also configured to have an inflator opening 36. Cover portion 12 has a plurality of retaining members or sidewalls 38 which are secured to an exterior portion 40 at one end and a tab mounting portion 42 to the other. Tab mounting portion 42 is also secured to a mounting tab or a securing member 44. Mounting tab 44 is configured to depend upwardly from mounting portion 42. In an exemplary embodiment mounting tabs 44 are orthogonal with respect to mounting portion 42. Of course, mounting tabs 44 may be configured to have any other angular configuration with respect to mounting portion 42.

Figure 2:
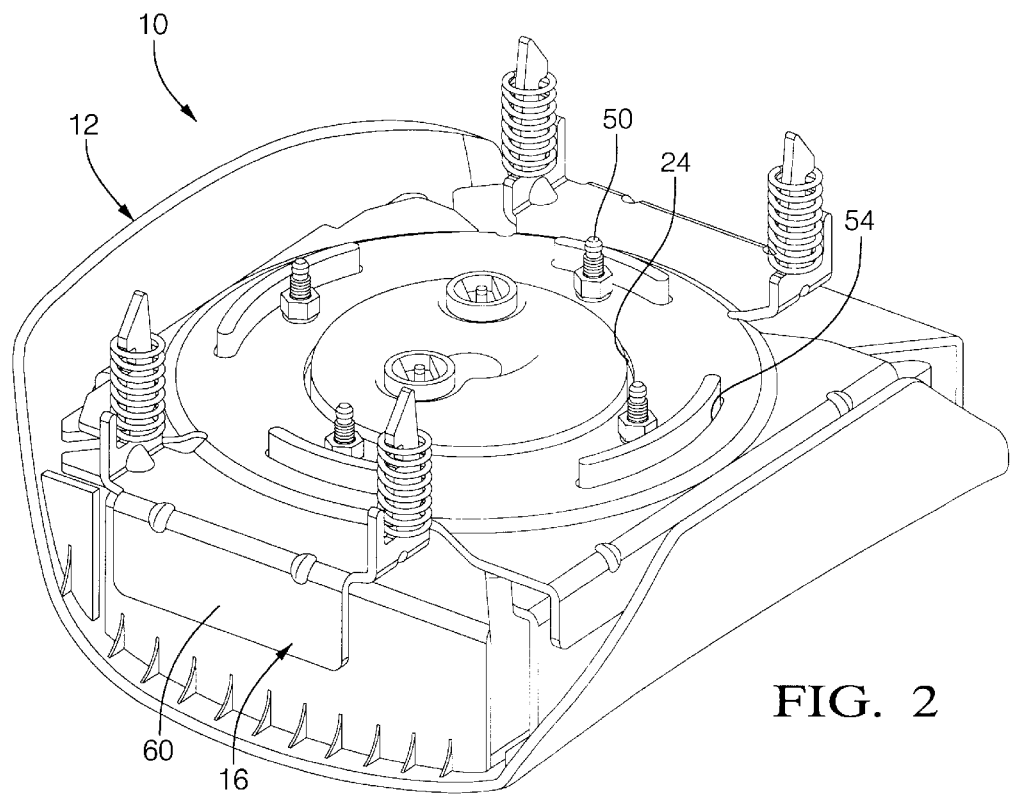
FIG. 2 is a bottom perspective view of the air bag module illustrated in FIG. 1.
Figure 3:
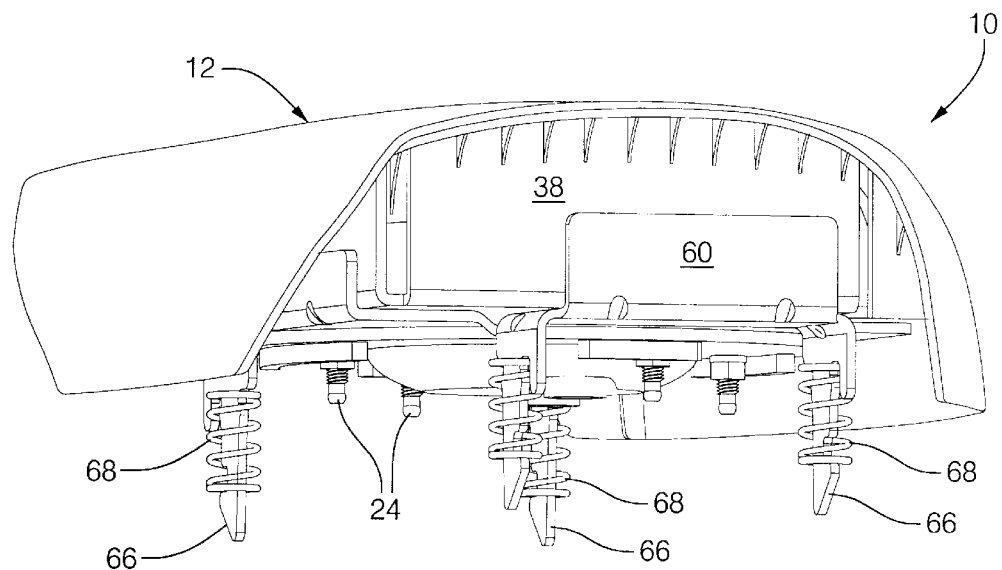
FIG. 3 is a side perspective view of the air bag module illustrated in FIGS. 1 and 2.
Figure 4:
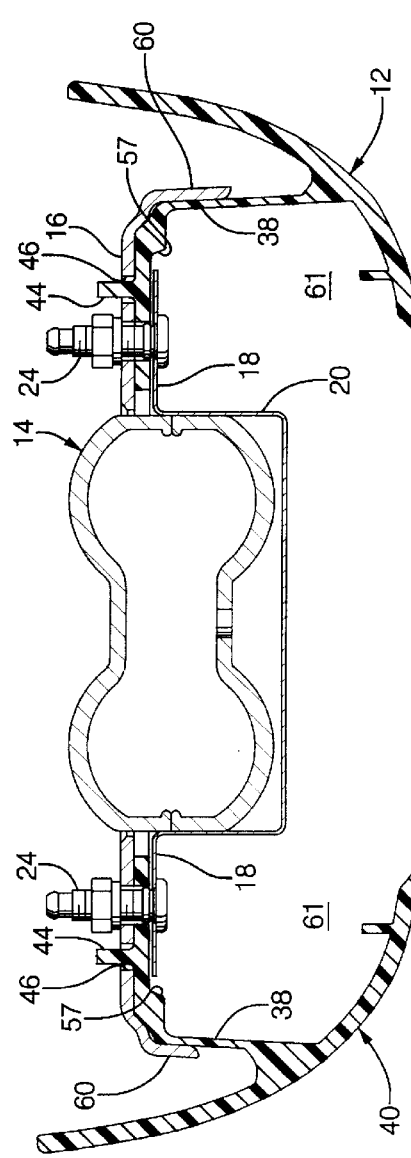
FIG. 4 is a cross-section view of an air bag module constructed in accordance with the present invention.
Figure 5:
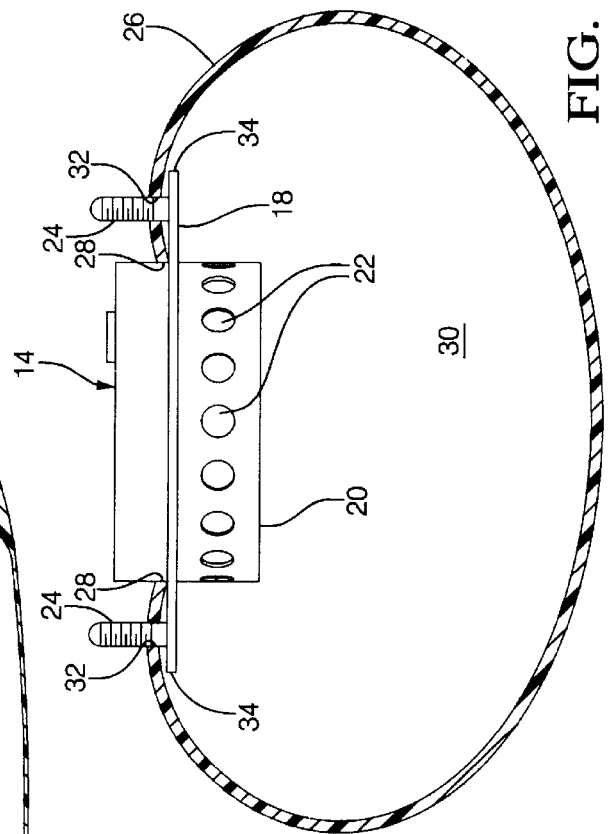
FIGS. 5–8 are cross-section of views illustrating the assembly process of an air bag module constructed in accordance with the present invention.

In an exemplary embodiment, cover portion 12 has four such sidewalls which depend from exterior portion 40 of cover 12 (FIGS. 1 and 2). In addition, each side wall 38 and mounting portion 42 is separated from each adjacent side wall 38 and mounting portion 42. Thus, each sidewall is capable of being deflected independently in response to a user or mechanically applied force.

A plurality of securement openings 46 are positioned in tab mounting portion 42 of each sidewall 38. Securement openings 46 are located so that a portion of mounting studs 24 pass there through when cover portion is assembled with inflator 14.

Cover portion 12 and in particular sidewalls 38 are constructed out of a resilient material capable of being deflected in a first direction (FIG. 6) and returning to an undeflected state (FIG. 7) after a deflection force has been applied and removed. Accordingly, and referring now to FIG. 6, sidewalls 38 are deflected in the direction of arrows 48 to allow inflator 14 and folded cushion to be received within an enlarged opening 36. Once inflator 14 is appropriately placed, the deflection force being applied to sidewalls 38 is removed and inflator studs 24 are allowed to pass through mounting apertures 46 of tab mounting portions 42.

Accordingly, cover portion 12 is now positioned over mounting studs 24 of inflator 14 (FIG. 7). Cover portion 12 is assembled onto inflator flange 14 after inflatable air bag 26 is installed, thus, once cover portion 12 is positioned over mounting studs 24 of inflator flange 14, a portion of inflatable air bag cushion 26 is sandwiched in between inflator flange 14 and mounting portion 42 of cover portion 12.

It is of particular importance to note that the current design which includes a portion of inflatable air bag cushion 26 being secured in-between inflator flange 14 and mounting portion 42 of sidewall 38, negates the need for a retainer ring or air bag cushion retainer which must be inserted into the air bag cushion and the appropriately positioned and then ultimately secured to the inflator or inflator flange.

Thus, the present design offers a much more simple assembly process by negating the need for an additional part as well as an additional assembly step.

Figure 8:
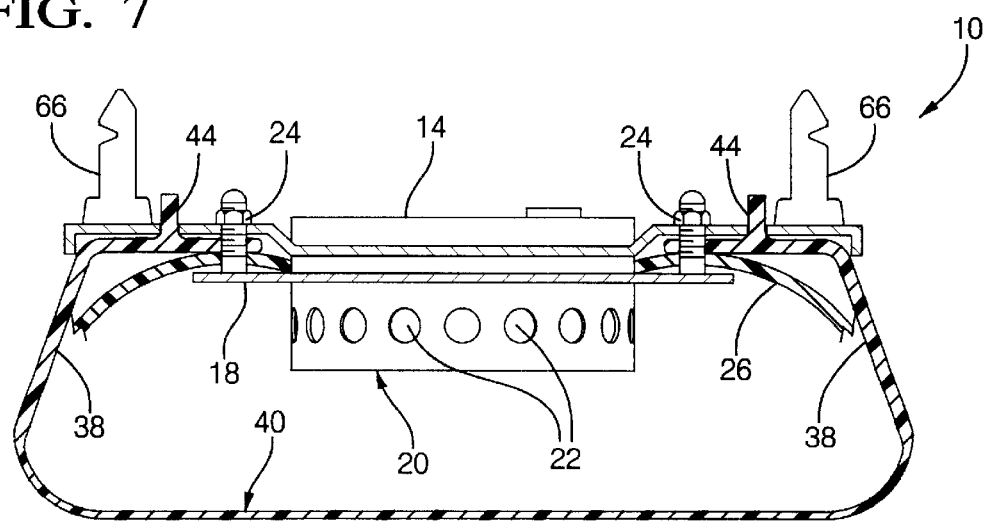

Referring now to FIGS. 1 and 8, the securement of base plate 16 to air bag module assembly 10 is now illustrated. Base plate 16 is constructed out of a material capable of being easily configured while also having rigid structural qualities. For example, base plate 16 can be manufactured out a steel, aluminum and plastic.

Base plate 16 is configured to have a central opening 50 which is configured to allow a portion of inflator 14 to pass therethrough. In addition, and positioned about central opening 50 a plurality of mounting apertures 52 are positioned to allow mounting studs 24 to pass therethrough.

Base plate 16 is also configured to have a plurality of mounting tab openings 54. Mounting tab openings 54 are positioned about the periphery of central opening 50 and are located to allow mounting tab portions 44 to pass therethrough, as base plate 16 is secured to air bag assembly 10.

In an exemplary embodiment, cover portion 12 has four sidewalls 38 and four complementary mounting tabs 44, accordingly four elongated mounting tab openings 54 are positioned around central opening 50. In an exemplary embodiment, mounting tabs 44 and mounting tab openings 54 each have a curved configuration. Of course, it is contemplated that the size, number and configuration of mounting tabs 44 and mounting studs 24 may vary.

In addition, and referring now to FIG. 1, and in an exemplary embodiment of the present invention, cover portion 12 and in particular mounting portion 42 is configured to have a raised mounting portion 56. Raised mounting portion 56 is configured to be received within a complementary mounting depression 58 of base plate 16.

In addition, raised mounting portion 56 corresponds to a receiving area 57 defined by cover portion 12, the receiving area being configured to receive a portion of inflator 14 and inflator flange 18 therein.

Accordingly, and as base plate 16 is positioned onto cover portion 12 and inflator 14, mounting studs 24, mounting tabs 44 and raised mounting portion 56 are received within apertures 52, openings 54 and depression 58 of base plate 16, respectively.

Base plate 16 also has a plurality of sidewalls 60. Sidewalls 60 depend upwardly from base plate 16. Sidewalls 60 are configured to be disposed adjacent to sidewalls 38 of cover portion 12. Accordingly, and as base plate 16 is assembled with mounting cover 12, base plate 16 and sidewalls 60 will provide structural support to sidewalls 38 of mounting cover 12. Sidewalls 60 and sidewalls 38 will provide structural support to an inner chamber 61 of air bag module 10. This additional support is particularly useful when air bag cushion 26 is inflated and causes a portion 41 of mounting cover 12 to break away.

In addition, base plate 16 is configured to have a plurality of protrusions 62 which are positioned to be received within a plurality of complementary depressions 64 in cover 12. (FIG. 1) Protrusions 62 and depressions 64 are positioned along a point of contact between sidewalls 60 and sidewalls 38. Protrusions 62 and complementary depressions 64 provide a means for aligning base plate 16 as it is assembled with the other component parts of air module assembly 10.

Base plate 16 also has a plurality of mounting pins 66. Mounting pins 66 depend downwardly from base plate 16 and are configured to be engaged by a locking mechanism disposed on the hub of a steering wheel into which air bag module assembly 10 is installed. Mounting pins 66 may be integral with base plate 16 or they can be attached directly to base plate 16. A plurality of mounting springs 68 are installed over mounting pin 66 and provide an urging force for disengaging air bag module assembly 10 from a steering wheel once the locking mechanism is disengaged.

In addition, mounting springs 68 can be employed to provide a biasing force for a horn activation system.

Once base plate 16 is fully positioned onto cover portion 12 and mounting studs 24 are passed through the openings in cover 12 as well as base plate 16, a plurality of mounting nuts 70 are received on a threaded portion of mounting studs 24. Mounting nuts 70 secure inflator 14, air bag cushion 26, cover 12 and base plate 16 to each other.

The configuration of inflator 14, cover 12 and base plate 16 allow air bag module assembly 10 to be assembled without an air bag cushion retainer and pad retainer. This will reduce the assembly costs as there are less parts to be installed as well as ease the assembly, thereby reducing labor costs.

Figure 9:
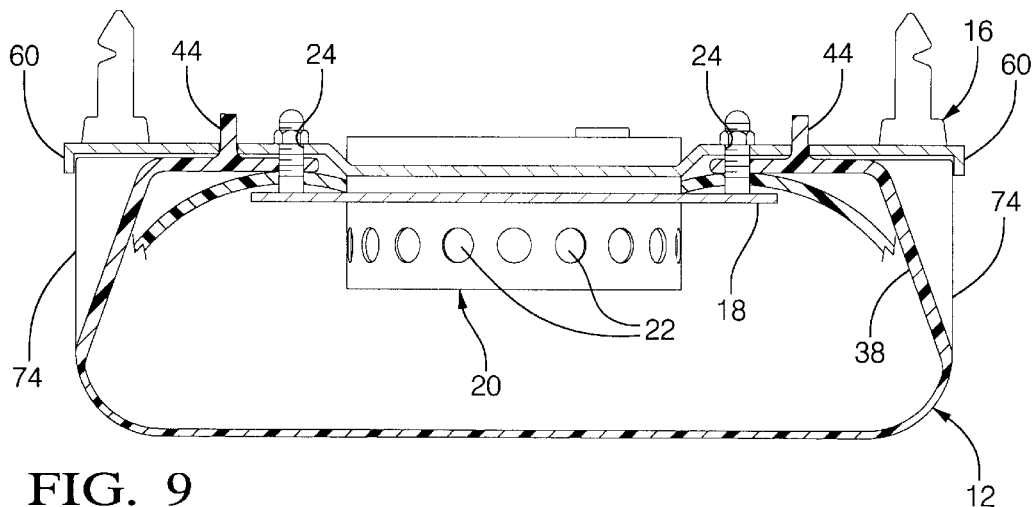
FIGS. 9–13 are cross-section of views of alternative embodiments of the present invention.

Referring now to FIG. 9 an alternative embodiment of the present invention is illustrated. Here cover portion 12 is configured to have sidewalls 74 in addition to sidewalls 38. Sidewalls 74 define an outer perimeter of cover portion 12. In addition, base plate 16 is configured to have a larger outer dimension and accordingly sidewalls 60 are positioned to be adjacent to sidewalls 74. Sidewalls 60 will provide support to sidewalls 74.

Figure 10:
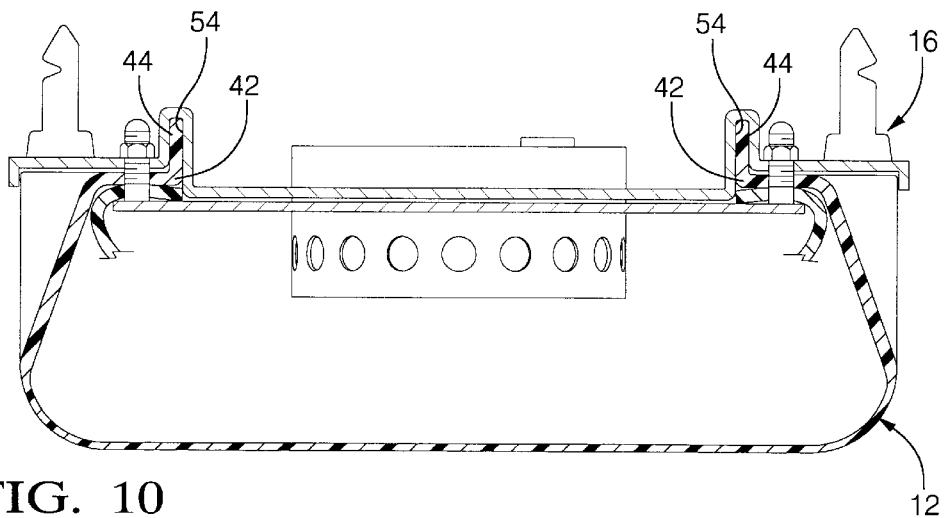

Referring now to FIG. 10, another alternative embodiment is illustrated. Here, base plate 16 is configured to have receiving areas 54 in lieu of receiving openings 54 (as illustrated in the FIGS. 1–9 embodiments). In addition, it is also noted that mounting tabs 44 of cover portion 12 are disposed at the end of mounting portion 42.

Figure 11:
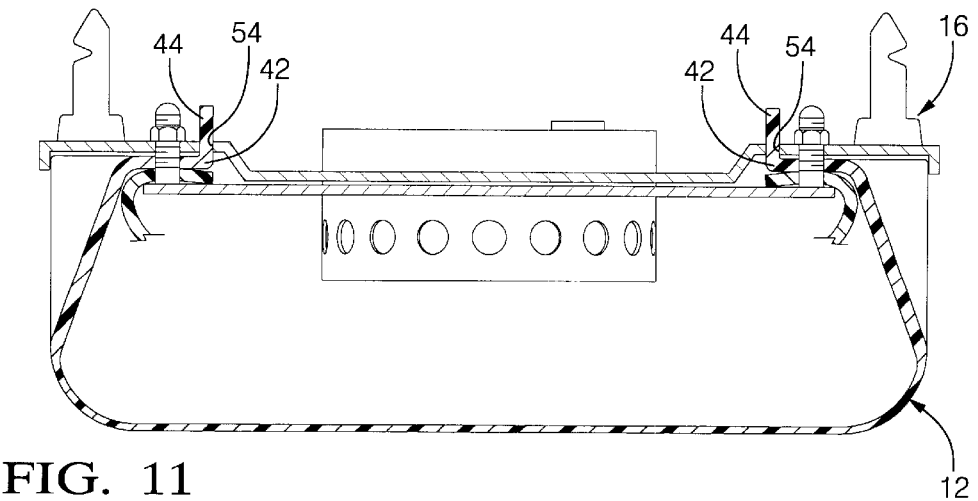

Referring now to FIG. 11, another alternative embodiment is illustrated. Here mounting tabs 44 pass through mounting tab openings 54 and base plate 16. Again, it is noted that mounting tabs 44 are positioned at the end of mounting portion 42 of cover portion 12.

Figure 12:
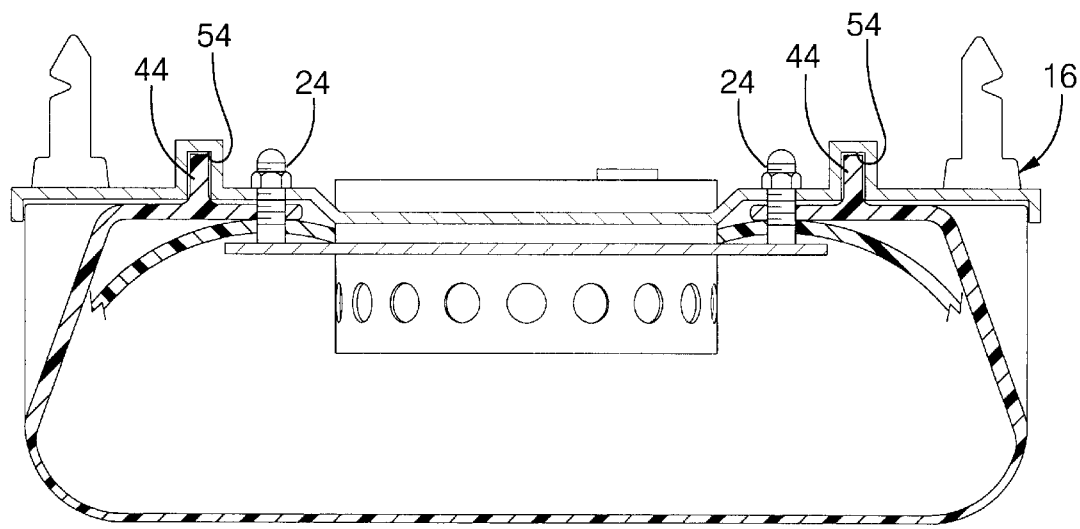

Referring now to FIG. 12, yet another alternative embodiment is illustrated. Here mounting tabs 44 are positioned outboard from mounting studs 24 and are received within receiving openings 54 of base plate 16. In addition, it is noted that the FIG. 12 embodiment also illustrates sidewalls 74 and a base plate configuration described and illustrated in FIG. 9. Of course, it is contemplated that the outer configuration of base plate 16 may resemble the configuration illustrated in FIGS. 1–8.

Figure 13:
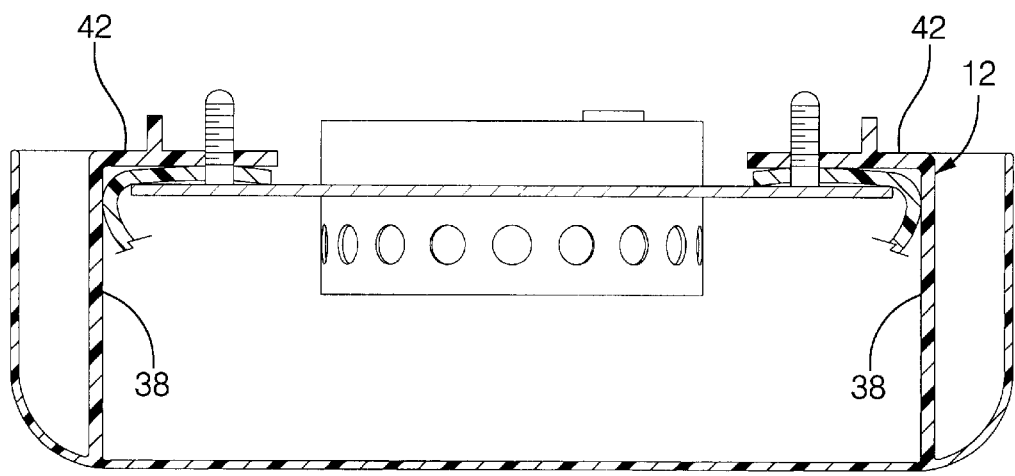

Referring now to FIG. 13, yet another alternative embodiment is illustrated. Here sidewalls 38 of mounting cover 12 are configured to and an orthogonal relationship with respect to mounting portion 42 of cover 12. Of course, it is contemplated that sidewalls 38 and mounting portion 42 may have any other angular relationship with respect to each other.

It is also noted that in any of the preceding alternative embodiments air bag module 10 can be manufactured without raised mounting portion 56, receiving area 57, depression 58, protrusions 62 and depressions 64.

Of course, it is contemplated that the various configurations of anyone of the previously described embodiments may be combined with features and elements of the other described embodiments.

In addition, while it is noted that an exemplary embodiment of the present invention has been described with reference to a driver side air bag module it is contemplated that the design disclosed herein can be used with all forms of air bag safety devices and other types of inflation mechanisms, including but not limited to passenger side and side impact inflation mechanisms.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An air bag module, comprising:
    a) an inflator having an inflator flange;
    b) a plurality of mounting studs extending outwardly from said inflator flange;
    c) an air bag cushion having an inflation opening, said inflation opening being configured and dimensioned to allow a portion of said inflator to be inserted into said air bag cushion, said plurality of mounting studs passing through openings in said air bag cushion;
    d) a cover having a plurality of retaining members and one or more predetermined tear seams, said plurality of retaining members being configured and dimensioned to allow said plurality of mounting studs to pass there through, each of said plurality of retaining members having a securement tab, said one or more predetermined tear seams being configured to allow portions of said cover to displace when said air bag cushion deploys;
    e) a base plate being configured and dimensioned to be secured to said cover portion and said plurality of mounting studs; and
    f) a plurality of securement members extending outwardly from said base plate, said securement members being configured, dimensioned and positioned to secure said air bag module in a pre-deployment position.

2. An air bag module as in claim 1, wherein said retaining members are constructed out of a resilient material and are capable of movement from a first position to a second position.

3. An air bag module as in claim 1, wherein said retaining members, comprise: a sidewall being secured to a portion of said cover at one end and a mounting portion at the other, and said securement tab depending outwardly from said mounting portion.

4. An air bag module as in claim 3, wherein said mounting portion of said retaining member defines a portion of an opening for receiving a portion of said inflator.

5. An air bag module as in claim 4, wherein said base plate further comprises a central opening, said central opening being configured, dimensioned and positioned to receive a portion of said inflator.

6. An air bag module as in claim 3, wherein said sidewalls define a portion of an inner cavity of said air bag module.

7. An air bag module as in claim 3, wherein said mounting portion of said retaining members have an opening being configured, dimensioned and positioned to allow said mounting studs pass there through.

8. An air bag module as in claim 7, wherein said base plate is configured to have a plurality of openings being configured, dimensioned and positioned to allow said mounting studs to pass there through.

9. An air bag module as in claim 3, wherein each of said mounting portions includes a protrusion, said protrusions of said mounting portions being received within a depression formed on said base plate.

10. An air bag module as in claim 1, wherein said mounting studs are fixedly secured to said inflator flange.

11. An air bag module as in claim 1, wherein said base plate is secured to said cover and said inflator by a plurality of fasteners, said plurality of fasteners threadingly engage a threaded surface of said mounting studs.

12. An air bag module as in claim 1, wherein said base plate has a plurality of openings being configured, dimensioned and positioned to allow said securement tabs of said plurality of retaining members to pass there through.

13. An air bag module, comprising:
  a) an inflator having an inflator flange;
  b) a plurality of mounting studs extending outwardly from said inflator flange;
  c) an air bag cushion having an inflation opening, said inflation opening being configured and dimensioned to allow a portion of said inflator to be inserted into said air bag cushion, said plurality of mounting studs passing through openings in said air bag cushion;
  d) a cover having a plurality of retaining members, said plurality of retaining members being configured and dimensioned to allow said plurality of mounting studs to pass there through, each of said plurality of retaining members having a securement tab;
  e) a base plate being configured and dimensioned to be secured to said cover portion and said plurality of mounting studs; and
  f) a plurality of securement members extending outwardly from said base plate, said securement members being configured, dimensioned and positioned to secure said air bag module in a pre-deployment position, wherein said base plate has a plurality of openings being configured, dimensioned and positioned to allow said securement tabs of said plurality of retaining members to pass there through.

14. An air bag module, comprising:
  a) an inflator having an inflator flange;
  b) a plurality of mounting studs extending outwardly from said inflator flange;
  c) an air bag cushion having an inflation opening, said inflation opening being configured and dimensioned to allow a portion of said inflator to be inserted into said air bag cushion, said plurality of mounting studs passing through openings in said air bag cushion;
  d) a cover having a plurality of retaining members, said plurality of retaining members being configured and dimensioned to allow said plurality of mounting studs to pass there through, each of said plurality of retaining members having a securement tab, said retaining members, comprise: a sidewall being secured to a portion of said cover at one end and a mounting portion at the other, and said securement tab depending outwardly from said mounting portion;
  e) a base plate being configured and dimensioned to be secured to said cover portion and said plurality of mounting studs; and
  f) a plurality of securement members extending outwardly from said base plate, said securement members being configured, dimensioned and positioned to secure said air bag module in a pre-deployment position, wherein each of said mounting portions includes a protrusion, said protrusions of said mounting portions being received within a depression formed on said base plate.

15. A method for assembling an air bag module, comprising:
  inserting a portion of an inflator having an inflator flange into an opening of an air bag cushion;
  securing said air bag cushion to said inflator flange by a plurality of mounting studs depending outwardly from said inflator flange;
  deflecting retaining members disposed on sidewalls of a airbag cover such that securement openings positioned in said retaining members receive a portion of said mounting, studs, a portion of said air bag cushion being located in between said inflator flange and said retaining members; and
  securing a base plate to said retaining members and said inflator flange by passing said plurality of mounting studs through openings in said base plate and by passing a plurality of securement tabs of said retaining members through complimentary openings in said base plate, said base plate being configured and dimensioned to allow said plurality of mounting studs to pass through said base plate and a plurality of fasteners are secured to said plurality of mounting studs.

16. An air bag module assembly, comprising;
  an inflator having an inflator flange defining an outer dimension and a plurality of mounting studs depending from said inflator flange in a first direction;
  an inflatable cushion having a first inflator opening and first apertures, said first inflator opening being smaller than said outer dimension and being configured to receive and inflation gas from said inflator, said first apertures being configured to receive said mounting studs therethrough;
  a cover portion having a second inflator opening, a plurality of sidewalls, and second apertures, said plurality of sidewalls being configured for deflection from a first position to a second position during assembly of the air bag module assembly, said second inflator opening being larger than said outer dimension when said plurality of sidewalls are in said second position, but less than said outer dimension when said plurality of sidewalls are in said first position, and said second apertures receiving said mounting studs therethrough when said plurality of sidewalls are in said first position such that said inflatable cushion is retained between said inflator flange and said cover portion
  a base plate having third apertures positioned to allow said plurality of mounting studs to pass therethrough; and
  means for securing said base plate, said inflator, and said inflatable cushion to each other, said securing means being disposed on said plurality of mounting studs, wherein said base plate comprises mounting pins depending from base plate, said mounting pins being engagable by a locking mechanism of a steering wheel into which the air bag module assembly is installed.

17. The air bag module assembly as in claim 16, wherein said cover portion has predetermined tear seams positioned to allow portions of said cover to displace when said inflatable cushion deploys.

18. The air bag module assembly as in claim 16, wherein said cover portion further comprises a plurality of mounting tabs depending from said cover portion in said first direction.

19. An air bag module assembly, comprising:

an inflator having an inflator flange defining an outer dimension and a plurality of mounting studs depending from said inflator flange in a first direction;

an inflatable cushion having a first inflator opening and first apertures, said first inflator opening being smaller than said outer dimension and being configured to receive an inflation gas from said inflator, said first apertures being configured to receive said mounting studs therethrough;

a cover portion having a second inflator opening, a plurality of sidewalls, and second apertures, said plurality of sidewalls being configured for deflection from a first position to a second position during assembly of the air bag module assembly, said second inflator opening being larger than said outer dimension when said plurality of sidewalls are in said second position, but less than said outer dimension when said plurality of sidewalls are in said first position, and second apertures receiving said mounting studs therethrough when said plurality of sidewalls are in said first position such that said inflatable cushion is retained between said inflator flange and said cover portion, said cover portion further comprises a plurality of mounting tabs depending away from said sidewalls;

a base plate having third apertures positioned to allow said plurality of mounting studs to pass therethrough; and means for securing said base plate, said inflator, and said inflatable cushion to each other, said securing means being disposed on said plurality of mounting studs, wherein said plurality of mounting tabs extend either through receiving openings or into receiving areas defined in said base plate.

20. The air bag module assembly as in claim 19, wherein said plurality of mounting tabs are disposed on said cover portion in a position that is either between said plurality of mounting studs and said second inflator opening or between said plurality of mounting studs and said outer dimension.

21. An attachment assembly for attaching an inflatable cushion to a flange of an inflator of an air bag module, comprising;

a cover portion having a plurality of sidewalls and first attachment apertures, said plurality of sidewalls being configured for deflection from a first position to a second position during assembly of the air bag module, said cover portion defining an inflator opening having a first dimension when said plurality of sidewalls are in said first position, and a second dimension when said plurality of sidewalls are in said second position, said second dimension being larger than said first dimension and said first dimension being smaller than an outer dimension of the flange, said attachment apertures being configured to receive mounting studs depending from the flange when said plurality to sidewalls are in said first position such that the inflatable cushion is retainable between the flange and said cover portion;

a base plate having second attachment apertures positioned to receive said mounting studs of said inflator therethrough; and mounting pins depending from base plate, said mounting pins being engagable by a locking mechanism of a steering wheel into which the air bag module is installed.

22. The attachment assembly as in claim 21 wherein said cover portion has an exterior surface that has aesthetic qualities capable of matching the interior of a vehicle.

23. The attachment assembly as in claim 21, wherein said cover portion has predetermined tear seams positioned to allow portions of said cover portion to displace during deployment of said inflatable cushion from the air bag module.

24. The attachment assembly as in claim 21, wherein said cover portion further comprises a plurality of mounting tabs depending from said cover portion.

25. The attachment assembly as in claim 24, wherein said plurality of mounting tabs extend either through receiving openings or into receiving areas defined in said base plate.

* * * * *